March 14, 1933.  F. S. BARKS  1,900,902
COUPLING
Filed April 10, 1931
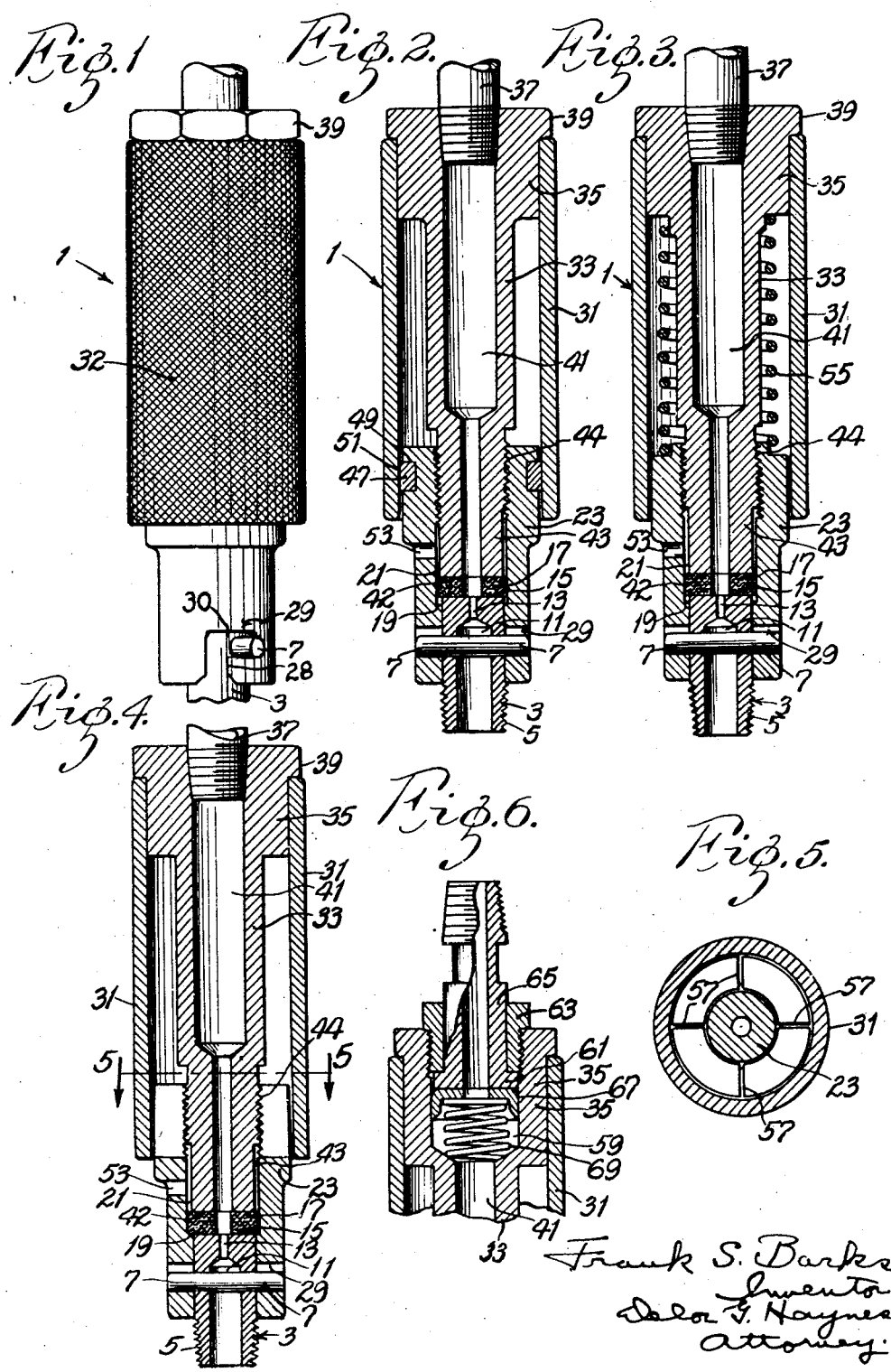

Patented Mar. 14, 1933

1,900,902

UNITED STATES PATENT OFFICE

FRANK S. BARKS, OF ST. LOUIS, MISSOURI

COUPLING

Application filed April 10, 1931. Serial No. 529,001.

This invention relates to couplings, unions or the like, and with regard to certain more specific features to devices of this class for use with pressure, lubricant-dispensing apparatus.

This invention comprises an improvement over the apparatus shown in the United States patent issued to R. J. Gits, No. 1,676,086, issued July 3, 1928.

Among the several objects of the invention may be noted the provision of a coupling which by means of an original manual turning impetus given thereto effects by a frictional device a communication between a dispensing and a receiving device, and by means of a continuing manual turning impetus of the same nature as said original impetus, effects a positive seal against internal pressure, said frictional drive providing smoother action and economy of time and effort; and the provision of a device of the class described which is of rugged and simplified construction. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawing, in which is illustrated several of various possible embodiments of the invention, Fig. 1 is a side elevation of one form of coupler applied to a fitting;

Fig. 2 is a longitudinal median section taken through Fig. 1;

Fig. 3 is a view similar to Fig. 2, but showing a modification of the invention;

Fig. 4 is a view similar to Fig. 2, but showing another modification of the invention;

Fig. 5 is a sectional view taken on line 5—5 of Fig. 4; and,

Fig. 6 is a longitudinal median section of a swivel adapted to be applied to said coupler.

Similar reference characters indicate corresponding parts throughout the several views of the drawing.

Referring now more particularly to Figs. 1 and 2, there is shown at numeral 1 a coupler applied to a fitting 3. As shown in Fig. 2, the fitting 3 comprises a hollow member exteriorly threaded at the lower end (numeral 5) for effecting a fastening and passage to a bearing member or the like to which material such as grease, oil or the like is to be dispensed under pressure.

A pin is positioned laterally through the fitting 3 thereby forming sideward extensions or lugs 7 which provide fastening means between the fitting 3 and the coupler 1. As shown in Fig. 2 the end of the passage 11 opposite the exteriorly threaded end is contracted as shown at numeral 13 to comprise a small bore which substantially prevents any entry of foreign matter into the passage 11 when the coupling 1 is removed. The small bore 13 may be replaced by the other known means, such as for instance a sealing means resiliently held against the opening 13. The fitting 3 also has a sealing surface 15, which is adapted to seat against a gasket, washer or packing 17.

As shown in Fig. 2, the coupler 1 comprises a nozzle member 33 and a connecting member 23 threaded on to the nozzle 33 at one end (numeral 44). The nozzle, as shown at numeral 43 extends beyond the threaded portion and terminates in a differential bore 21 of the member 23. This extension has a sealing surface 42. The nozzle also has a bore 41 at one end of which is inserted a pipe 37 which flexibly connects the nozzle with a pressure lubricating apparatus or system, the pipe 37 having a flexible line serially arranged therewith. A sleeve or gripping member 31 is either integrally formed with said nozzle 33, or joined thereto by soldering or the like at a peripherally extended portion 35. The sleeve extends appreciably down over the nozzle 33 and is annularly spaced therefrom. A knurled gripping surface 32 is formed on the outside surface of the sleeve 31. A hexagonal portion 39 on the nozzle 33 serves as a wrench receiving portion.

The bore 21 of the connecting member 23 is also adapted to receive the fitting 3, and this portion of the member 23 is provided with bayonet slots 29 or the like for receiving the lugs 7 of the fitting 1. The slots 29 comprise a longitudinal or axial portion 28 and an angular portion 30, whereby as the fitting 3 and the lugs 7 are positioned in the bore 21 and the slots 29, the longitudinal portions 28 first receive the lugs and a clockwise rotation of the body 23 then positions the lugs in the portions 30, thereby preventing longitudinal removal of the lugs 7.

A shoulder 19 is formed in the bore 21, and is so positioned that the surface 15 of the fitting 3 positioned in the bore 21 extends slightly beyond the shoulder 19.

The packing 17 is positioned in the bore 21 and is prevented from inadvertent removal therefrom by the shoulder 19. Thus the packing 17 is between the two sealing surfaces 15 and 42 when said surfaces are juxtaposed.

The packing 17 is preferably formed from a resilient composition such as is described in the patent application of William Z. Linders, Serial No. 495,831, filed November 15, 1930 (file 7756), which is formed by alternately placing fabric and rubber layers together. The packing thus formed is oil and grease resisting, and furthermore expands radially when subjected to an axial pressure. It is to be understood, however, that a leather or like packing or gasket may be used.

A vent 53 is formed in the body 23 to provide an outlet for any grease which may escape past the packing 17 in the event that a tight seal is not obtained between the surfaces 15 and 42.

In couplers of the class described the sealing between the coupler 1 and the fitting 3 is accomplished by placing the connecting member 23 over the fitting 3, and interlocking the slots 29 and the lugs 7, and threading the nozzle 33 farther into the member 23, whereby the surfaces 42 and 15 are forced against the packing 17.

It is advantageous to accomplish the locking of the connecting member 23 and the fitting 3 and to effect the sealing of the surfaces 42 and 15 by the same continuous rotation of the nozzle 33, rather than by separate operations of the members 23 and 33. I accomplish this locking and sealing in a single operation by providing a frictional drive between the body 23 and the nozzle 33. In the Fig. 2 modification the frictional drive comprises a strip of resilient material 47 placed around the body 23 and seated in a groove 49. The material 47 may comprise cork, fibre, or a spring steel ring. The strip 47 reacts against the inner surface of the sleeve 31 (numeral 51) which extends over the body 23 when said body is threaded onto said nozzle 33. The frictional drive thus set up is substantially constant.

The coupler 1 is applied to the fitting 3 by longitudinally placing the fitting 3 in the differential bore 21 of the body 23, and at the same time aligning the lugs 7 and the bayonet slots 29. The coupler 1 is now pushed over the fitting 3, until the lugs 7, sliding into the portions 28 reach the bottom thereof. Then the nozzle 33 is given a clockwise twist by the grip 32 which results in the body 23 turning on the fitting 3 thereby positioning the lugs 7 into the slots 30. The turning of the body 23 by the nozzle 33 is brought about through the friction drive between the sleeve 31 of the nozzle 33 and the body 23. After the complete seating of the lugs 7 in the slots 30, additional clockwise rotation of the sleeve 31 results in the threading of the portion 43 of the nozzle 33 farther into the body portion 23, whereby the surfaces 42 and 15 react against the packing 17, which is accordingly put under pressure between the two surfaces. The threading of the nozzle 33 into the body 23 begins when the lugs 7 reach the bottom of the slots 30.

In order to remove the coupler 1 from the fitting 3, the sleeve 31 is turned counterclockwise, whereupon the nozzle 33 turns in the body 23 because the friction drive between them is insufficient to overcome the friction between the lugs 7 and the notches 29. Thus the surface 42 is removed from the packing 17, and finally the friction between the fitting 3 and the body 23 is reduced to less than the frictional drive at the strip 47 and the body 23 turns with the nozzle 33 and the lugs 7 slide out of the slots 30 into the longitudinal slots 28. The coupler 1 is now pulled from the fitting. A wrench may be applied to the portion 39 for removal purposes if the internal pressure becomes too high to permit removal by hand, as when a bearing is "frozen" so tightly that the pressure builds up instead of breaking through.

An advantage of this type of coupler over the couplers formerly used in pressure lubrication is the compactness and ruggedness of the structure. The frictional engagement is effective at an infinite series of points, rather than at a finite number, and hence no more movement need be effected than is necessary to accomplish the end in view, namely, application and removal of the device. This not only saves effort but also time.

Referring now more particularly to the modification shown in Fig. 3 the coupler and fitting are the same as those described in Figs. 1 and 2, and accordingly the same reference characters will be used to identify corresponding parts. In this modification the frictional drive between the nozzle 33 and the body 23 is obtained by a compression spring 55 which, seated against the peripheral extension 35, reacts against the body 23. The strip 47 is omitted. The friction drive is developed by the pressure which the spring 55 sets at the threaded portions of the body 23 and the nozzle 33. An advantage of this form of the coupler 1 is the simplicity with which such a structure is manufactured. The effect is to maintain a substantially predetermined tightness at the threads 44 as they wear. Thus the frictional effect is kept substantially constant.

Likewise the modification shown in Fig. 4 differs from the previous modification only in the manner in which frictional drive is accomplished between the nozzle 33 and body 23. As before similar reference characters will be used to indicate parts corresponding to similar parts in Figs. 1, 2 and 3.

In this modification the friction drive is obtained by springingly threading the body 23 into the nozzle 33. This spring action is accomplished by forming the bore 21, of the body 23 slightly smaller than the portion 43 of the nozzle 33. Radial notches 57 are provided in the threaded end of the body 23. Thus when the portion 43 is threaded into the smaller bore 21 the body portion 23 resiliently expands, because of the slots 57, to receive the portion 43. Thus a friction drive is created between the surfaces of the threaded portion, due to the pressure existing therebetween. This friction is substantially constant.

In this modification there are no separate wearing parts in the friction drive and a consequent advantage is gained.

Referring now more particularly to Fig. 6 there is shown a swivel joint which may be applied to the coupler 1 in the portion 35 of the nozzle member 33 between the tubing 37 and the nozzle 33. This swivel member is used when the tubing 37 connecting the coupler 1 to the pressure system is relatively rigid and not flexible. The swivel is positioned in the portion 35 in a bore 59 which is appreciably larger than the bore 41, but is a continuation thereof. The swivel comprises a bearing 63, threadably mounted in the nozzle 33. A sleeve 61 is rotatably mounted on the bearing 63. The sleeve 61 has a collar or shoulder 65 which is kept seated against the end of the bearing 63 by a compression spring 69. A cup washer 67 is positioned between the sleeve 61 and the spring. The end of the sleeve 61 opposite the collar 65 is externally threaded to receive the tubing 37 connecting said coupler 1 to the pressure lubricating supply. Thus even though a relatively rigid tubing is attached to the sleeve 61, relative rotational movement is permitted between the tubing 37 and the coupler 1.

In view of the above, it will be seen that the several objects of the invention are achieved and other advantageous results obtained.

As many changes could be made in carrying out the above constructions without departing from the scope of the invention, it is intended that all matter contained in the above description or shown in the accompanying drawing shall be interpreted as illustrative and not in a limiting sense.

I claim:

1. In combination a hollow fitting, and a coupler for a pressure lubricating system, said coupler comprising a nozzle and a hollow connecting member having a threaded bore and being adapted to thread with said nozzle, said connecting member also being adapted to lock with said fitting to join said fitting and nozzle, and means between said nozzle and connecting member adapted to provide a substantially constant frictional drive therebetween, said means comprising resilient means reacting between said nozzle and connecting member, said means constituting the only driving means between said nozzle and said connecting member.

2. In combination a hollow fitting, and a coupler for a pressure lubricating system, said coupler comprising a nozzle and a hollow connecting member having a threaded bore adapted to thread with said nozzle, said connecting member also being adapted to interlock with said fitting to join said fitting and nozzle in a fixed relationship, and means between said nozzle and connecting member adapted to provide a substantially constant frictional drive therebetween, said means comprising a spring reacting between said nozzle and connecting member, said spring constituting the only driving means between said nozzle and said connecting member.

3. In combination a fitting and a coupler for a pressure lubricating system, said coupler comprising a nozzle, and a connecting member having a threaded portion adapted to thread with said nozzle, said connecting member also being adapted to interlock with said fitting to join said fitting and nozzle, means between said nozzle and connecting member adapted to provide a substantially constant frictional drive therebetween, and means mounted on said nozzle adapted to provide a swivel connection between said coupler and a line joining said system, said means comprising a sleeve rotatably mounted in a bearing, and said bearing being mounted in said nozzle member said sleeve being adapted to be joined to said line.

4. In combination a hollow fitting, and a coupler for a pressure lubricating system, said coupler comprising a nozzle and a hollow connecting member having a threaded bore and being adapted to thread with said nozzle, said connecting member also being adapted to lock with said fitting to join said fitting and nozzle, and means between said nozzle and connecting member adapted to provide a substantially constant frictional drive therebetween, said means comprising a helical compression spring reacting between said nozzle and connecting member, said means constituting the only driving means between said nozzle and said connecting member.

5. In combination a hollow fitting, and a coupler for a pressure lubricating system, said coupler comprising a nozzle and a hollow connecting member having a threaded bore and being adapted to thread with said nozzle, said connecting member also being adapted to lock with said fitting to join said fitting and nozzle, and means between said nozzle and connecting member adapted to provide a substantially constant frictional drive therebetween, said means comprising a radially expanding spring member positioned in a groove in said connecting member and expanding against the nozzle member, said means constituting the only driving means between said nozzle and said connecting member.

In testimony whereof, I have signed my name to this specification this 7th day of April, 1931.

FRANK S. BARKS.